(No Model.)

A. WEMPLE.
GRAIN CUTTING MACHINERY.

No. 339,720.

3 Sheets—Sheet 1.

Patented Apr. 13, 1886.

Witnesses:
Chas. E. Gaylord.
Frederick F. Goodwin.

Inventor:
Andrew Wemple
by Offield & Towle,
Attorneys.

(No Model.) 3 Sheets—Sheet 2.
A. WEMPLE.
GRAIN CUTTING MACHINERY.

No. 339,720. Patented Apr. 13, 1886.

Witnesses:
Chas. E. Gaylord.
Frederick P. Goodwin.

Inventor:
Andrew Wemple
by Offield and Towle
Attorneys.

(No Model.)  3 Sheets—Sheet 3.

A. WEMPLE.
GRAIN CUTTING MACHINERY.

No. 339,720. Patented Apr. 13, 1886.

Witnesses:
Chas. E. Gaylord.
Frederick J. Goodwin

Inventor:
Andrew Wemple
by Offield & Towle
Attorneys

UNITED STATES PATENT OFFICE.

ANDREW WEMPLE, OF CHICAGO, ILLINOIS, ASSIGNOR TO FERDINAND SCHUMACHER, OF AKRON, OHIO.

GRAIN-CUTTING MACHINERY.

SPECIFICATION forming part of Letters Patent No. 339,720, dated April 13, 1886.

Application filed July 9, 1883. Serial No. 100,382. (No model.)

*To all whom it may concern:*

Be it known that I, ANDREW WEMPLE, a citizen of the United States, residing at Chicago, in the county of Cook and State of Illinois, have invented certain new and useful Improvements in Grain-Cutting Machinery, of which the following is a specification.

My invention relates to a machine for converting the kernels of oats and other grains, by shearing or cutting the same, into a coarse meal of any desired grade in such a manner as to avoid that loss of the grain which results when any portion of the same is reduced to a fine flour or dust.

The object of my invention is to rapidly and efficiently convert the hulled kernels of grain into a coarse meal of a uniform quality, thus obtaining a meal of any desired grade direct from the converter without the necessity of screening the same, and, further, to secure a machine which will require but very little care in handling, not liable to clog or be rendered inoperative, and which may be easily and cheaply constructed.

Figure 1:
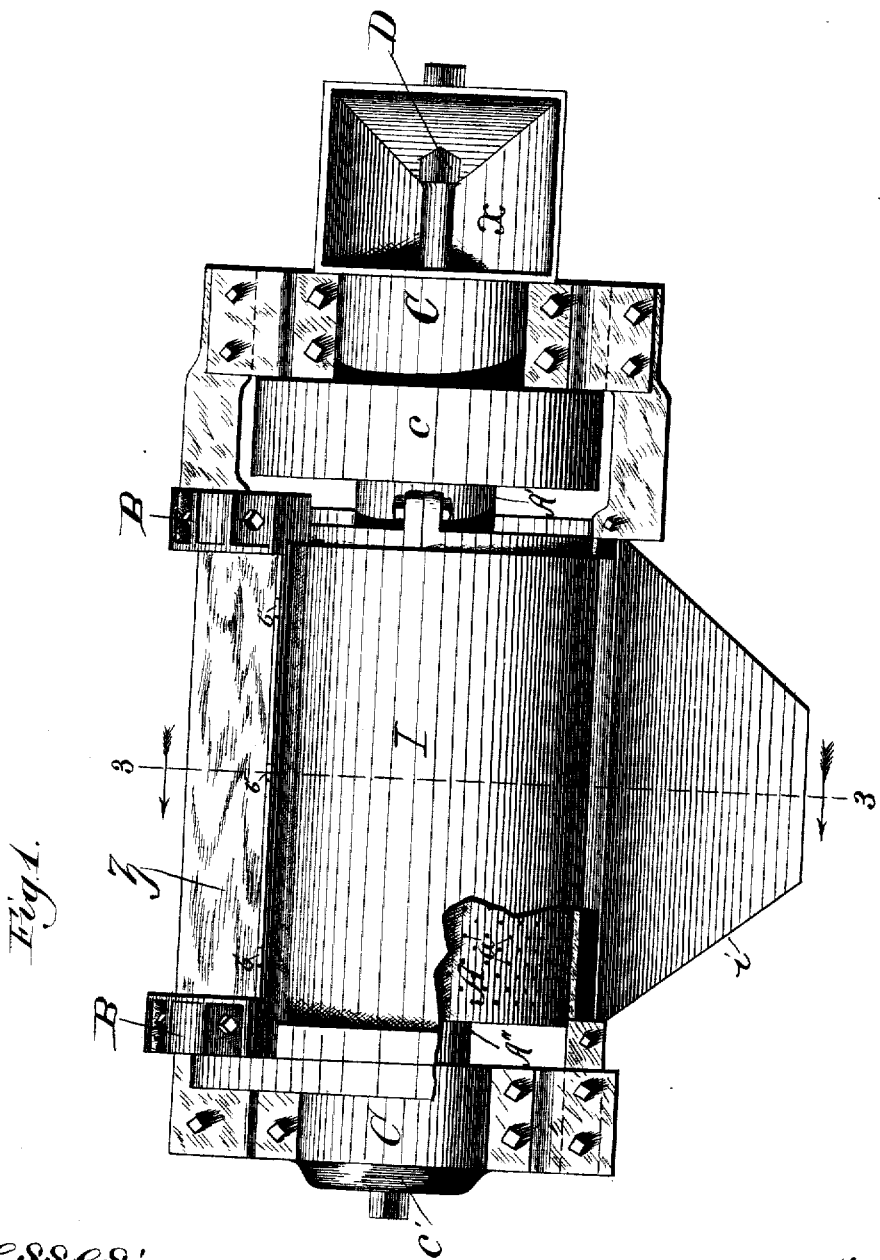
Figure 2:
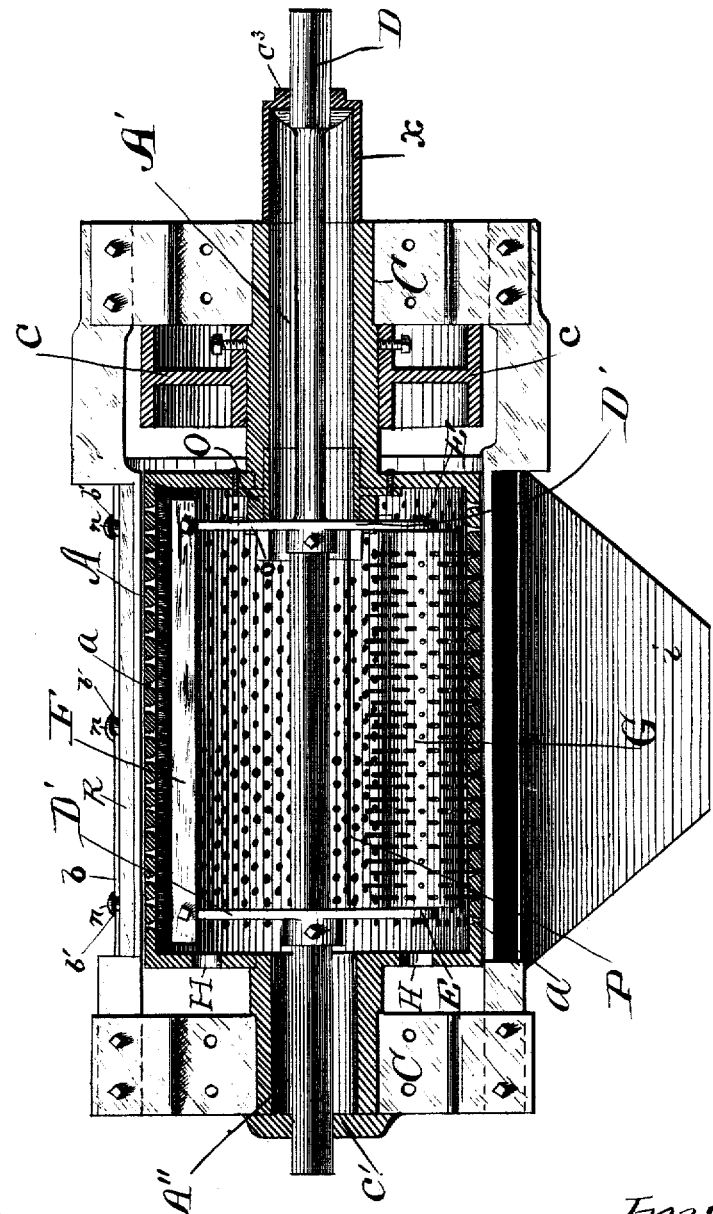
Figure 3:
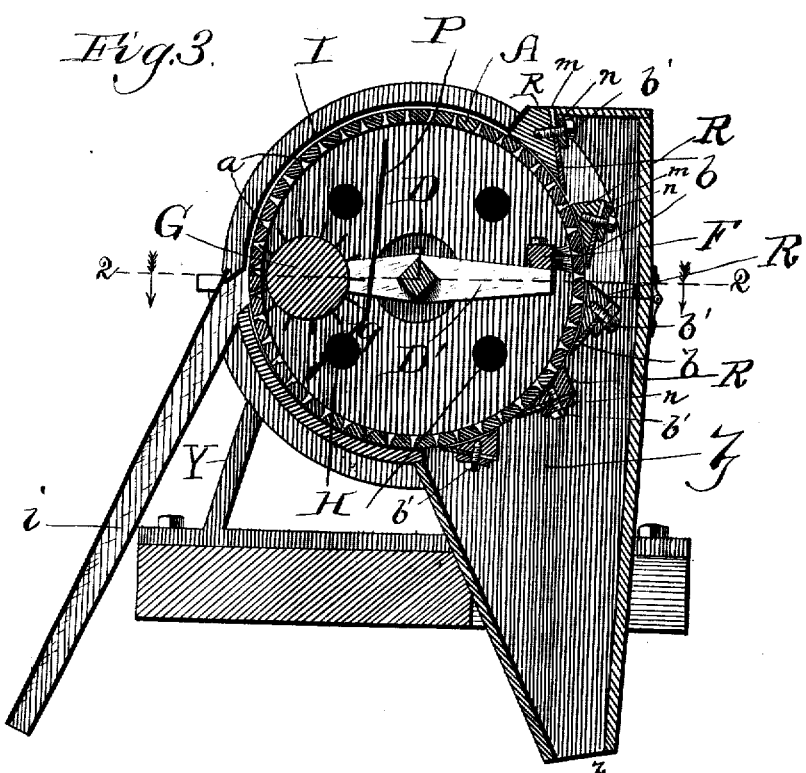
Figure 4:
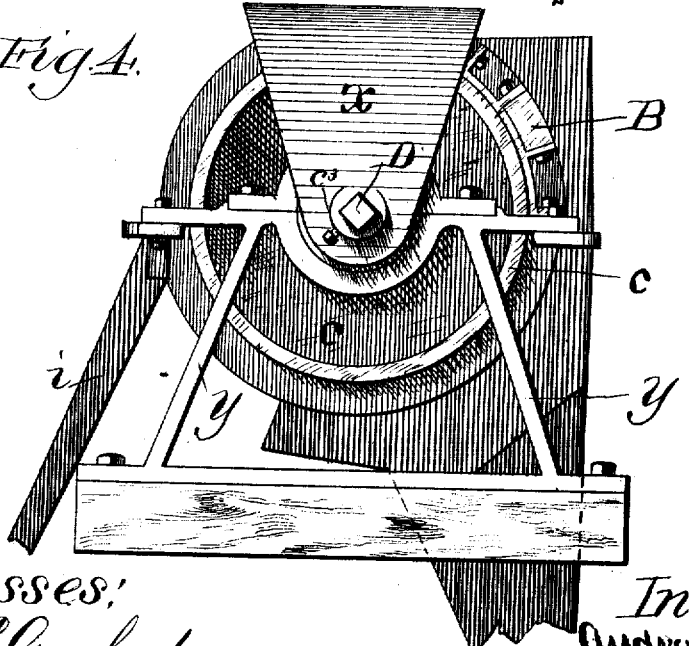

I have illustrated my invention by the drawings accompanying this specification, in which Figure 1 is a plan. Fig. 2 is a horizontal cross-section on the line 2 2, Fig. 3. Fig. 3 is a vertical section on line 3 3, Fig. 1. Fig. 4 is an end elevation.

Like letters refer to like parts throughout the several views.

X is a hopper, into which the grain is fed.

Y is a frame supporting the machine and the hopper.

A is a cylinder, into which the grain is received through the neck A' from the hopper. A'' is a similar neck at the other end, and forming a part of cylinder A.

$a\ a$ are the holes or perforations in the cylinder A, through which the grain is forced or driven when the machine is in operation.

B is an apron, partially surrounding the perforated cylinder A, on which are placed the adjustable knives $b\ b$. These knives are adjustably secured to the apron B by means of screw-bolts $b'$, passing through slots $m$ in the outer ends of the knives, and through nuts or washers $n$. By loosening the bolts the knives may be adjusted within the limits permitted by the slots, and then clamped in the desired position between the nuts and apron by again tightening the bolts. The knives are secured to the longitudinal knife-bearing bars R of the apron.

C C are the journal-boxes surrounding necks A' A'' of the cylinder A, allowing the cylinder to revolve freely.

$c$ is a pulley or geared wheel, which may be placed on the neck A' or A'', as preferred, and by means of which the cylinder is caused to revolve.

D is a rod, of any desired shape, which passes completely through the perforated cylinder A and necks A' A'', and, passing through a rectangular opening, $c^3$, in the hopper X, and a like opening in the cap C', upon the opposite side of the machine, is held therein against rotation. The rod is preferably made cylindrical where it passes through the spout O, neck A', and interior of hopper X.

D' D' are arms placed one at each end of the perforated cylinder, in the inside thereof. One end of each of the arms D' D' is provided with a journal, E, and within these opposite journals rests the shaft of a freely-revolving roller, G. The other ends of the arms D' D' are united by a fixed brush, F, of any suitable material. The brush F may, however, if preferred, be attached directly to the rod D.

$g\ g$ are pins secured to the roller G in such a manner as to register in the holes $a$ in the perforated cylinder A. I prefer to place this roller G, having pins $g$ secured thereto, in the inside of the perforated cylinder; but it is evident that it may be placed on the outside thereof.

H H are outlets in the end of perforated cylinder A, permitting the "overflow" to escape.

I is an apron partially surrounding the perforated cylinder, serving also to control and guide a portion of the escaping grain to the point of delivery $i$.

O is a deflector or spout fastened to arm D' at points $o\ o$ on said arm, or it may be fastened directly to rod D. The purpose of this fixed auxiliary spout is to deliver the grain some distance within the cylinder and between the arms D' D'.

P is a shield preventing the grain from being thrown against roller G when that roller is placed in the inside of the perforated cylinder. The shield is fastened at opposite ends to the arms D' D' by means of side lugs or otherwise.

Z is a case, partially surrounding the perforated cylinder, for conducting the grain to the point of delivery z.

The perforated cylinder A is preferably cast in two pieces, provided with suitable flanges, R, whereby the pieces may be fastened together, in order that the arm or bearing D' D', with the connections placed thereon, may be put on the inside thereof. Both ends of the perforated cylinder may be placed perfectly level. The knives b b are removable from apron B, and may be adjusted on the same.

The manner in which my improved machine operates is as follows: The perforated cylinder is made to revolve, the hulled kernels of grain are fed into the hopper, and by force of gravity descend to the bottom thereof into the end of the neck of the cylinder, and are carried by said neck through the spout into the said perforated cylinder. The grain passing through the spout is thrown against the inner surface of the perforated cylinder in such a manner that a large portion of the grain enters the holes or perforations in said cylinder, and the rapid rotation thereof holds the kernels of grain in the holes against the apron. The kernels thus held in said holes are brought against and the ends thereof sheared or cut by a knife or knives, the cut portions falling down and out through the opening in the case. The kernels of grain falling or being thrown from the spout not entering into the holes or perforations are carried by the revolving of the perforated cylinder backward and upward against a brush, which fits closely to the inside of the cylinder, and, striking the brush, are deflected or thrown back toward the bottom of the cylinder and into the holes or perforations. The kernels of grain remaining in the holes or perforations as said holes pass the brush are forced outward, and are cut as they pass the knife or knives. A small portion of the grain fed in the hopper will not be thrust or thrown into the holes or perforations in the cylinder, and constitute what may be called the "overflow" in my machine; and in order to avoid the clogging of the machine or any embarrassment of its working by the presence of this overflow, I provide outlets in the end of the perforated cylinder, through which it may escape. A portion of the grain passes through the perforations of the cylinder during its operation, at a point opposite the knives, and consequently escapes from the cylinder without being cut. To prevent this escaping grain from scattering or mixing with the grain that has been already cut, I provide apron I and spout i, to deliver it at a point beyond the grain already cut. This uncut grain may be returned to the hopper and passed a second time through the machine. As the perforated cylinder revolves, the small pins in the roller enter into the holes or perforations in the cylinder as they pass said roller, and any kernels or parts or pieces of kernels remaining in said holes are thrust therefrom, and are conducted away by the spout i, so that the holes in said cylinder will not become clogged or filled, and are at all times open to receive the shower of grain from the spout and the brush. When this roller is placed on the inside of the perforated cylinder, I place a shield over it to protect it from the shower of grain from the spout and brush. This shield also lessens the amount of uncut grain escaping from the perforated cylinder, and, if the roller is placed outside of the cylinder, serves no other purpose.

Having thus described my invention, what I claim, and desire to secure by Letters Patent, is—

1. In a grain-cutting machine, the combination, with a rotatory perforated cylinder and a central feed-conduit attached thereto, of an inner stationary frame-work having a cross-arm extending across the feed end of the conduit, and an auxiliary spout forming a continuation of the latter and attached to the frame-work, whereby the incoming grain may be delivered at a point of the cylinder within the frame-work, substantially as shown and described.

2. In a grain-cutting machine, the combination, with a rotatory perforated cylinder, of a fixed knife-holding apron partially surrounding the same, a feed-conduit, and a partition located longitudinally within the cylinder and at one side of the feed-conduit, whereby the amount of uncut grain passing through the cylinder is lessened, substantially as shown and described.

3. In a grain-cutting machine, the combination, with a rotatory perforated cylinder and its central feed-conduit, of a central stationary rod, cross-bars attached to the said rod, a roller journaled between said cross-bars, and bearing-pins registering with the perforations of the cylinder, and a shield or partition intermediate between the central feed-conduit and the roller, whereby the latter is protected from the incoming grain and its freedom of action preserved, substantially as shown and described.

4. In a grain-cutting machine, the combination, with a rotatory perforated cylinder, of an apron partially surrounding said cylinder and provided with a series of knives, a roller provided with pins registering with the perforations of the cylinder, and a stationary brush located within and bearing against the inner surface of the cylinder, substantially as shown and described.

5. In a grain-cutting machine, the combination, with a rotatory perforated cylinder and a fixed series of external cutting-knives partially surrounding the same, of a roller located within the cylinder at a point opposite the cutting-knives and provided with pins registering with the perforations of the cylinder, and separate exit-spouts adjacent, respectively, to the knives and roller, whereby such grain as remains in the perforations uncut after their rotation past the knives is forced out and led off into a receptacle separate from that receiving the cut grain, substantially as shown and described.

6. In a grain-cutting machine, the combination, with a rotatory perforated cylinder, of a fixed series of cutting-knives exterior thereto, and a stationary brush located within the cylinder and bearing against its inner surface at a point intermediate of successive knives of the series, whereby grain remaining within the perforations and uncut by the first knives of the series will be forced outward and cut by the succeeding ones, substantially as shown and described.

7. In a grain-cutting machine, the combination, with a rotatory perforated cylinder, of a hopper and feed-spout at one end thereof, a stationary rod extending through the cylinder, an auxiliary spout, a brush, and a shield supported by said rod, and a roller having peripheral pins registering with the perforations of the cylinder, substantially as shown and described.

ANDREW WEMPLE.

Witnesses:
FREDERICK C. GOODWIN,
E. F. RUNYAN.